United States Patent [19]

Morino et al.

[11] Patent Number: 4,540,905
[45] Date of Patent: Sep. 10, 1985

[54] ELECTROMAGNETIC DRIVING DEVICE

[75] Inventors: Seiji Morino, Okazaki; Hisasi Kawai, Toyohashi, both of Japan

[73] Assignee: Nippon Soken, Inc., Nishio, Japan

[21] Appl. No.: 538,570

[22] Filed: Oct. 3, 1983

[30] Foreign Application Priority Data

Oct. 5, 1982 [JP] Japan .................. 57-173847

[51] Int. Cl.³ ............................... H02K 33/00
[52] U.S. Cl. ........................ 310/12; 310/15
[58] Field of Search ............. 310/15, 13, 14, 12, 310/27

[56] References Cited

U.S. PATENT DOCUMENTS

| 118,538 | 8/1871 | Jones | 310/15 |
| 2,409,857 | 10/1946 | Hines et al. | 310/15 |
| 3,943,443 | 3/1976 | Kimura et al. | 310/154 |
| 4,259,602 | 3/1981 | Kuribayashi et al. | 310/12 |
| 4,260,914 | 4/1981 | Hertrich | 310/154 |

FOREIGN PATENT DOCUMENTS 55-26414  2/1980  Japan .

Primary Examiner—Donovan F. Duggan
Attorney, Agent, or Firm—Cushman, Darby & Cushman

[57] ABSTRACT

An electromagnetic driving device for causing linear movement of a movable member. The device includes a fixed magnetic core around the entire length of which a coil is wound. The cross-sectional area of the central portion of the fixed magnetic core is greater than the cross-sectional area of the end portions of the fixed magnetic core so that the fixed magnetic core is not excessively heavy even if the stroke of the movable member is relatively large.

4 Claims, 14 Drawing Figures

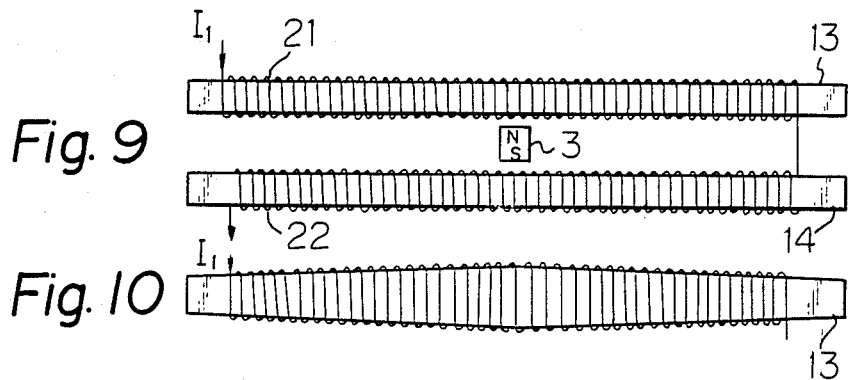
Fig. 9
Fig. 10
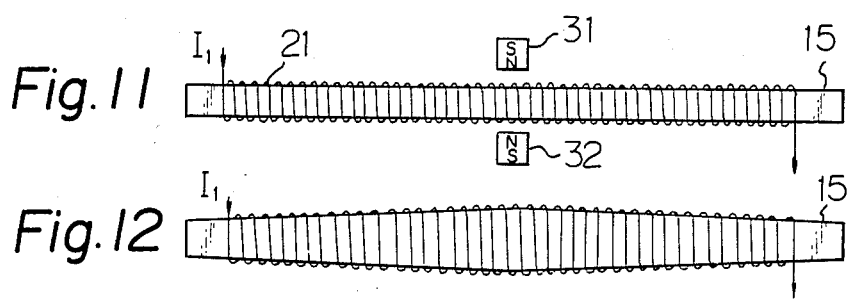
Fig. 11
Fig. 12
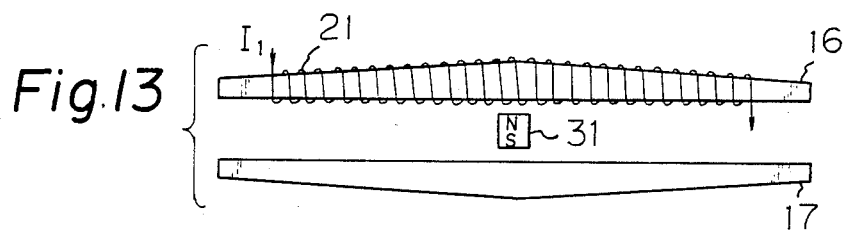
Fig. 13
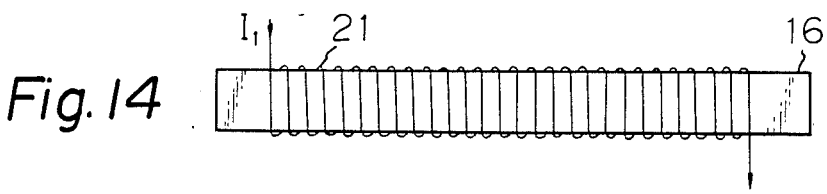
Fig. 14

ELECTROMAGNETIC DRIVING DEVICE

BACKGROUND OF THE INVENTION

1. Field of the Invention

The present invention relates to an electromagnetic driving device for causing linear movement of a member to be driven. The electromagnetic driving device according to the present invention is used, for example, for a speedometer of an automobile, a tachometer of an automobile, a linear tracking arm of a record player for moving a tone arm, or a printer for printing characters.

2. Description of the Prior Art

In a conventional electromagnetic driving device for causing linear movement of a movable member, two bar-shaped fixed magnetic cores are arranged in parallel at a distance therebetween.

The movable member is located between the fixed magnetic cores and is capable of moving freely in the longitudinal direction. A coil is wound on one fixed magnetic core. A unidirectional magnetic field is formed between the fixed magnetic cores by the movable member. The movable member is moved in the longitudinal direction by the interaction between the unidirectional magnetic field and the current of the coil.

In order to increase the stroke, i.e., the range of movement, of the movable member while maintaining the same driving force, the cross-sectional area of the coil-wound fixed magnetic core must be increased in proportion to the increase in the length of the fixed magnetic core. The longer the fixed magnetic core, the greater the number of turns of the coil winding and, hence, the greater the magnetic flux. The increase of the cross-sectional area of the fixed magnetic core is therefore necessary to prevent magnetic flux saturation.

To double the stroke with the same driving force, therefore, it has thus been necessary to double both the length and the cross-sectional area of the fixed magnetic core, thereby increasing the weight of the fixed magnetic core four times. Thus, in the prior art, to increase the stroke of the movable member, one has had to chose between the disadvantage of a considerably increased weight of the fixed magnetic core or a reduction in the driving force.

An example of a prior art electromagnetic driving device for causing linear movement is disclosed in Japanese Unexamined Utility Model Publication (Kokai) No. 55-26414 of Yokogawa Denki Seisakusho, entitled "Linear Meter".

SUMMARY OF THE INVENTION

It is the object of the present invention to provide an improved electromagnetic driving device in which the overall cross-sectional area of the fixed magnetic core is not excessively large and, hence, the weight of the fixed magnetic core is not excessively heavy even if the stroke of the movable member is relatively large.

According to the present invention there is provided an electromagnetic driving device comprising: at least one fixed magnetic core made of a bar of magnetic material, the cross-sectional area of the central portion of the bar being greater than the cross-sectional area of the end portions of the bar; a coil wound along the length of the at least one fixed magnetic core from one end to the other end thereof; and at least one movable member, made of a magnet arranged in proximity to the at least one fixed magnetic core having the coil for producing a magnetic flux crossing approximately perpendicularly to the current of the coil and for being adapted to move along the axis of the at least one fixed magnetic core.

BRIEF DESCRIPTION OF THE DRAWINGS

In the drawings,

FIG. 9 illustrates another embodiment of the present invention;

FIG. 10 is a plan view of the embodiment of FIG. 10;

FIG. 11 illustrates another embodiment of the present invention;

FIG. 12 is a plan view of the embodiment of FIG. 11;

FIG. 13 illustrates a further embodiment of the present invention; and

FIG. 14 is a plan view of the embodiment of FIG. 13.

DESCRIPTION OF THE PREFERRED EMBODIMENTS

Figure 1:
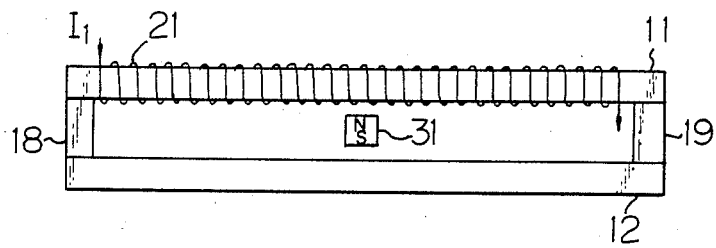
FIG. 1 is an elevational view of a prior art electromagnetic driving device.

Before describing the preferred embodiments, an explanation will be given on the structure of a prior art electromagnetic driving device in reference to an elevational view in FIG. 1 and a plan view in FIG. 2.

Fixed magnetic cores 11 and 12 are arranged in parallel at a distance therebetween. Additional fixed magnetic cores 18 and 19 are arranged laterally in parallel to form a closed magnetic path.

A movable member 31 is located between the fixed magnetic cores 11 and 12, and is capable of moving freely in the longitudinal direction. A coil 21 is wound on the fixed magnetic core 11. A unidirectional magnetic field is formed between the fixed magnetic cores 11 and 12 by the movable member 31. The movable member 31 is moved in the longitudinal direction by the interaction between the unidirectional magnetic field and the current $I_1$ of the coil 21.

Figure 3:
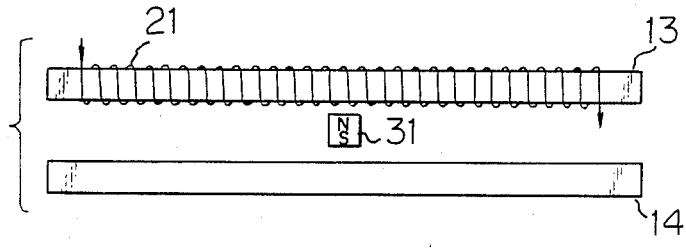
FIG. 3 is an elevational view of an electromagnetic driving device according to an embodiment of the present invention.
Figure 4:
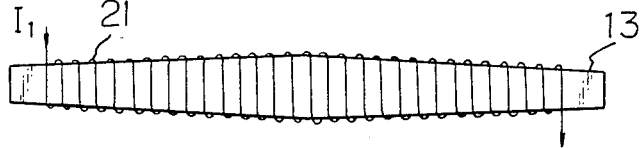
FIG. 4 is a plan view of the device of FIG. 3.

An electromagnetic driving device according to an embodiment of the present invention is illustrated in the elevational view of FIG. 3 and the plan view of FIG. 4. Fixed magnetic cores 13 and 14 are arranged in parallel at a distance therebetween. The ends of the fixed magnetic cores 13 and 14 are not closed.

The movable member 31 is located between the fixed magnetic cores 13 and 14 and is capable of moving freely therealong. The coil 21 is wound uniformly on the fixed magnetic core 13. The cross-sectional area of the central portion of each of the fixed magnetic cores 13 and 14 is greater than the cross-sectional area of the end portions thereof, as illustrated in FIG. 4.

Figure 5:
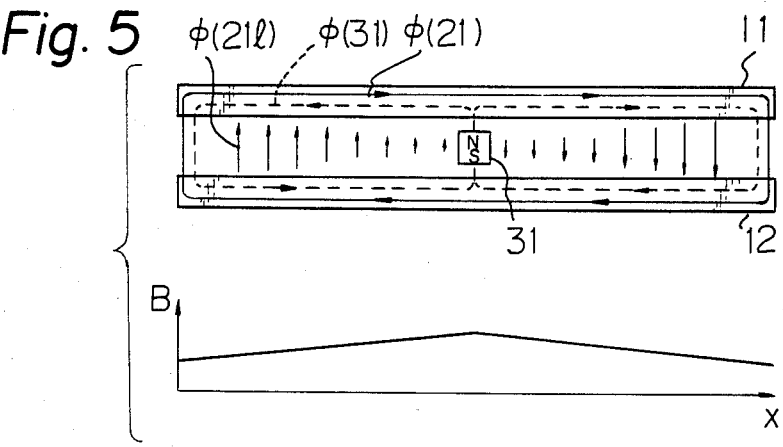
FIG. 5 is a diagram for illustrating the principle of the present invention.

The principle of operation of the device of FIG. 3 will be understood with reference to FIG. 5, showing the distribution of the magnetic flux in the upper portion and the change of magnetic flux density in the fixed magnetic core in the lower portion.

Figure 2:
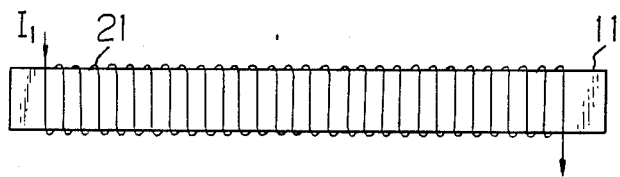
FIG. 2 is a plan view of the device of FIG. 1.

In the prior art device of FIG. 1, removal of the additional fixed magnetic cores 18 and 19 will result in magnetic flux $\phi(21)$ caused by the coil 21, leakage magnetic flux $\phi(21l)$ from the coil 21, and magnetic-flux $\phi(31)$ caused by the movable member 31. In the upper portion of FIG. 5, the arrows $\phi(21l)$ represent the directions of magnetic flux by their directions and the values of magnetic flux by their lengths. The value of the leakage magnetic flux $\phi(21l)$ is greater in the end portion than in the central portion, while, to the contrary, the magnetic flux density in the fixed magnetic core caused by the coil 21 is greater in the central portion than in the end portion. The abscissa of the graph in the lower portion of FIG. 5 denotes the distance in mm of movement in the rightward direction of the movable member 31, taking the left end of the fixed magnetic cores 11 and 12 as the origin.

If the central portion of the fixed magnetic cores 11 and 12 is in the saturated state due to the magnetic flux $\phi(21)$ caused by the coil 21, the magnetic flux $\phi(31)$ of the movable member 31 is prevented from entering into the fixed magnetic cores 11 and 12, and, hence, the driving force for the movable member 31 is reduced. Accordingly, in order to avoid such reduction of the driving force, it is necessary to ensure a sufficient area of the cross-section of the fixed magnetic cores 11 and 12 to avoid the saturation of the magnetic flux.

However, since the magnetic flux density is not so large in the end portions of the fixed magnetic cores 11 and 12 because of leakage of magnetic flux, it is possible to make the cross-sectional area of the end portions of the fixed magnetic cores 11 and 12 smaller. Hence, it is possible to keep down the weight of the fixed magnetic cores 11 and 12 while keeping the driving force of the movable member constant.

The magnetic leakage flux from the movable member 31 is omitted from the explanation of FIG. 5 for simplification of explanation. The reduction of the driving force due to the magnetic leakage flux is negligible.

Figure 6:
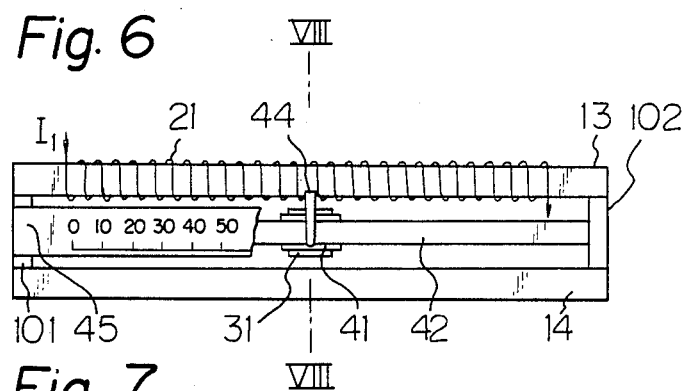
FIG. 6 illustrates a speedometer of the horizontal movement type in which the device according to the present invention is used.
Figure 7:
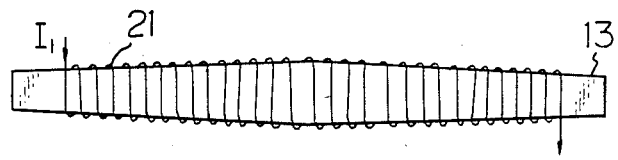
FIG. 7 is a plan view of the fixed magnetic core of the device of FIG. 6.
Figure 8:
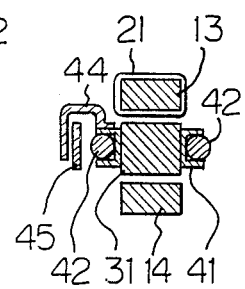
FIG. 8 is a cross-sectional view along line VIII—VIII of the device of FIG. 6.

A speedometer of the horizontal movement type to which the electromagnetic driving device of FIG. 3 is applied is illustrated in FIG. 6. A plan view of the fixed magnetic core 13 of FIG. 6 is given in FIG. 7. A cross-sectional view of the device of FIG. 6 is given in FIG. 8.

In the device of FIG. 6, the movable member 31 is fixed by means of adhesive material to a guide rail 41 having a slot. The movable member 31 can be moved freely horizontally along two slide bars 42, 42 arranged in parallel at a predetermined distance, keeping contact at the slot portions of the slide bars 42, 42. The slide bars 42, 42 are fixed to the yokes 101 and 102 bridging the fixed magnetic cores 13 and 14.

The front panel 45 on which the numerals are indicated is fixed to the yokes 101 and 102. An indicator 44 is fixed to the guide rail 41.

A spring is provided between the movable member 31 and one of the fixed magnetic cores 101 and 102.

Thus, it is possible to indicate the speed of the automobile by passing current corresponding to the automobile speed through the coil 21.

If a potentiometer is coupled with the movable member to detect its position, it is possible to carry out servo control.

The present invention is not limited to the above described embodiment. Various modifications and alterations are possible without departing from the scope and spirit of the present invention.

For example, it is possible to have the fixed magnetic cores 13 and 14 wound by coils 21 and 22 to double the driving force, as illustrated in FIGS. 9 and 10.

Also, it is possible to provide a fixed magnetic core 15 and a pair of movable members 31 and 32 having opposite polarities and arranged in parallel at a predetermined air distance with respect to the fixed magnetic core 15, as illustrated in FIGS. 11 and 12.

In the device of FIGS. 3 and 4 the change of cross-sectional area of the fixed magnetic core 13 is attained by changing the width of the fixed magnetic core 13, while the thickness of the magnetic core 13 is maintained constant. It is also possible, however, to attain the change of cross-sectional area of the fixed magnetic cores 16 and 17 by changing the thickness of the fixed magnetic core, while the width of the magnetic core is maintained constant, as illustrated in FIGS. 13 and 14.

We claim:

1. An electromagnetic driving device comprising:
   at least one fixed magnetic core made of a longitudinally extending bar of magnetic material, the cross-sectional area of the central portion of said bar being greater than the cross-sectional area of the end portions of said bar, the cross sectional area of said bar being linearly reduced along the the length of said bar, from said central portion, where said cross-sectional area is greatest, towards said end portions;
   a coil wound along the length of said at least one fixed magnetic core from one end to the other end thereof; and
   at least one movable member made of a magnet arranged in proximity to said at least one fixed magnetic core having said coil for producing a magnetic flux crossing approximately perpendicularly the current of said coil and for being adapted to move along the axis of said at least one fixed magnetic core.

2. A device according to claim 1, wherein said device comprises two fixed magnetic cores and one movable member located between said two fixed magnetic cores.

3. A device according to claim 1, wherein said device comprises two movable members and one fixed magnetic core located between said two movable members.

4. A device according to claim 1, wherein said device comprises a first fixed magnetic core having a coil and a second fixed magnetic core without a coil, and said movable member is located between said first and second fixed magnetic cores.

* * * * *